(12) United States Patent
Yamauchi et al.

(10) Patent No.: US 9,196,910 B2
(45) Date of Patent: Nov. 24, 2015

(54) FUEL CELL

(75) Inventors: Masaki Yamauchi, Osaka (JP); Yasushi Sugawara, Osaka (JP); Shinsuke Takeguchi, Osaka (JP); Yoichiro Tsuji, Osaka (JP); Hiroki Kusakabe, Osaka (JP); Takashi Morimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 258 days.

(21) Appl. No.: 13/818,376

(22) PCT Filed: Apr. 16, 2012

(86) PCT No.: PCT/JP2012/002610
§ 371 (c)(1),
(2), (4) Date: Feb. 22, 2013

(87) PCT Pub. No.: WO2013/021523
PCT Pub. Date: Feb. 14, 2013

(65) Prior Publication Data
US 2013/0157164 A1 Jun. 20, 2013

(30) Foreign Application Priority Data
Aug. 10, 2011 (JP) ................. 2011-174625

(51) Int. Cl.
H01M 8/02 (2006.01)
H01M 8/10 (2006.01)

(52) U.S. Cl.
CPC .... *H01M 8/0273* (2013.01); *H01M 2008/1095* (2013.01); *H01M 2250/20* (2013.01); *Y02E 60/50* (2013.01); *Y02T 90/32* (2013.01)

(58) Field of Classification Search
CPC .................................................... H01M 8/0273
USPC ............................................................ 429/480
See application file for complete search history.

(56) References Cited

U.S. PATENT DOCUMENTS

| 7,695,846 B2 | 4/2010 | Sabin et al. |
| 7,794,864 B2 | 9/2010 | Morimoto et al. |

(Continued)

FOREIGN PATENT DOCUMENTS

| JP | 2003-217613 | 7/2003 |
| JP | 2004-311254 | 11/2004 |

(Continued)

OTHER PUBLICATIONS

International Search Report issued May 15, 2012 in International (PCT) Application No. PCT/JP2012/002610.

(Continued)

*Primary Examiner* — Stewart Fraser
*Assistant Examiner* — Olatunji Godo
(74) *Attorney, Agent, or Firm* — Wenderoth, Lind & Ponack, L.L.P.

(57) ABSTRACT

A close attachment region is provided on the outer side relative to an outer edge portion of a gas diffusion layer and on the inner side relative to the inner edge portion of a gasket as seen from the thickness direction of a polymer electrolyte membrane, such that separators and a frame member are closely attached to each other. Thus, it becomes possible to suppress an increase in the manufacturing cost and a reduction in the power generation performance, which is attributed to the impurity eluted from the gasket and flowing toward the gas diffusion layer.

9 Claims, 6 Drawing Sheets

(56) References Cited

U.S. PATENT DOCUMENTS

| | | | |
|---|---|---|---|
| 2003/0082430 A1* | 5/2003 | Suzuki | 429/36 |
| 2006/0127735 A1 | 6/2006 | Sabin et al. | |
| 2008/0166622 A1 | 7/2008 | Shizuku et al. | |
| 2009/0142641 A1 | 6/2009 | Morimoto et al. | |
| 2010/0221637 A1* | 9/2010 | Nakagawa et al. | 429/483 |
| 2010/0297533 A1* | 11/2010 | Takeshita et al. | 429/508 |
| 2011/0305976 A1 | 12/2011 | Tanahashi et al. | |
| 2011/0311898 A1 | 12/2011 | Yamauchi et al. | |

FOREIGN PATENT DOCUMENTS

| | | |
|---|---|---|
| JP | 2006-506795 | 2/2006 |
| JP | 2008-218100 | 9/2008 |
| JP | 2009-59721 | 3/2009 |
| JP | 2009-170273 | 7/2009 |
| JP | 2009-230876 | 10/2009 |
| JP | 2010-257595 | 11/2010 |
| JP | 2010-267536 | 11/2010 |
| JP | 2010-282940 | 12/2010 |
| WO | 2008/072550 | 6/2008 |
| WO | 2010/114139 | 10/2010 |
| WO | 2011/083548 | 7/2011 |

OTHER PUBLICATIONS

English translation of International Preliminary Report on Patentability issued Feb. 20, 2014 in International (PCT) Application No. PCT/JP2012/002610.

Extended European Search Report issued Dec. 5, 2014 in corresponding European Patent Application No. 12822737.8.

* cited by examiner

Fig.4
Fig.5
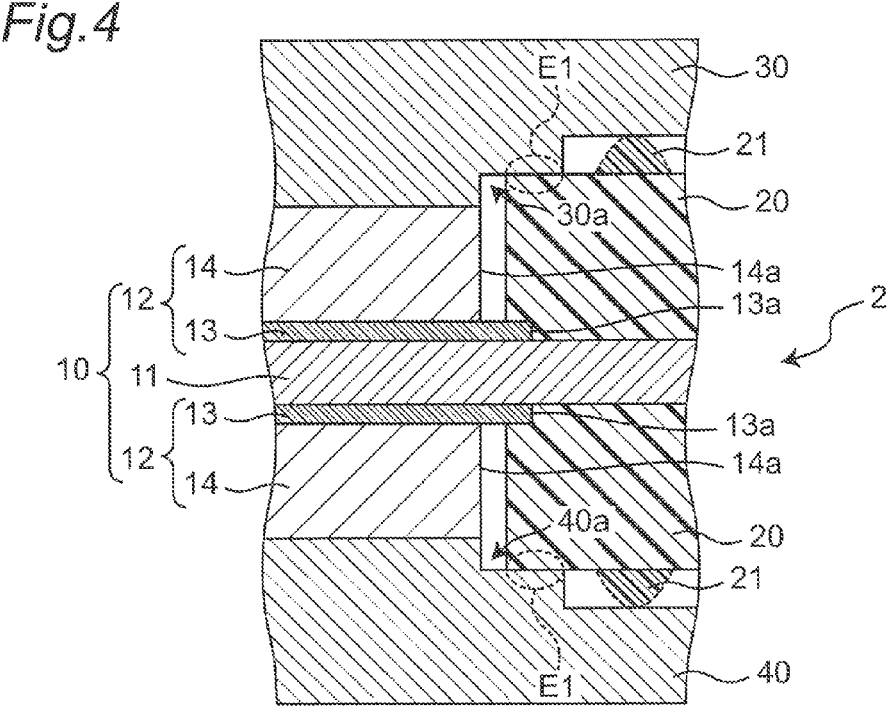
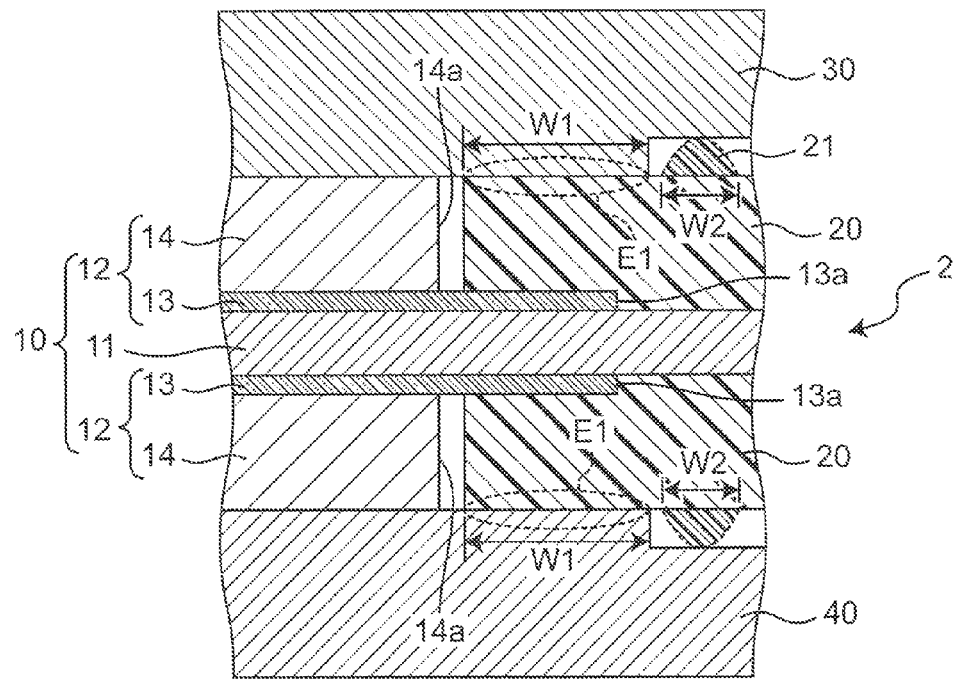

FUEL CELL

TECHNICAL FIELD

The present invention relates to a fuel cell used as a drive source for, e.g., a mobile object such as an automobile, a dispersed power generation system, a domestic cogeneration system, or the like.

BACKGROUND ART

A fuel cell (e.g., a polymer electrolyte fuel cell) is a device that causes a fuel gas containing hydrogen and an oxidant gas containing oxygen such as air to electrochemically react with each other, to simultaneously produce electric power and heat. Since the fuel cell directly or indirectly converts the chemical energy of the fuel into electric energy, high power generation efficiency can be achieved.

The fuel cell is generally configured by: stacking a plurality of cells (unit cells); and fastening them with fastening members such as bolts under pressure. One cell is configured such that a membrane electrode assembly (hereinafter referred to as the MEA) is sandwiched by one paired plate-like conductive separators. The MEA has its peripheral portion (hereinafter also referred to as the outer circumferential region) retained by a frame member formed to be casing trim-like, for the purpose of improving handleability. It is noted that, as used herein, the MEA provided with the frame member is referred to as the electrode-membrane-frame assembly.

The MEA is configured by a polymer electrolyte membrane having its outer circumferential region (peripheral portion) retained by the frame member, and paired electrode layers that are respectively formed at the opposing faces of the electrolyte membrane and that are arranged on the inner side of the frame member. The paired electrode layers are configured by catalyst layers formed at the opposing faces of the polymer electrolyte membrane, and gas diffusion layers respectively formed on the catalyst layers. By the paired electrode layers being supplied with a reactant gas (fuel gas or oxidant gas), an electrochemical reaction occurs, whereby electric power and heat are produced.

Further, on the surface of the frame member, a gasket (elastic member) is provided so as to seal between each separator and the frame member, in order to block or suppress leakage of the reactant gas to the outside. The gasket is normally made of a resin material.

The gasket normally contains additives or softeners, which are required for retaining the gas leakage avoiding function. Further, the gasket normally contains plasticizers, additives, and antioxidants, which are required for forming the shape of the seal through injection molding or the like, and reactants thereof or degradation products remained after the molding. These substances contained in the gasket may include impurity which serves as a catalyst poison inhibiting the power generating reaction of the fuel cell. Accordingly, the conventional fuel cell configured as described above involves the problem that the impurity contained in the gasket is eluted into moisture in the reactant gas or into water produced in accordance with the electrochemical reaction, whereby the electrode layer is poisoned. When the electrode layer is poisoned, the electrochemical reaction is inhibited, and a reduction in the power generation performance of the fuel cell is invited.

Therefore, conventionally, a resin material (e.g., fluorine-base resin) from which impurity is not eluted or is eluted little is employed as the material of the gasket, or a structure with which the impurity eluted from the gasket does not poison MEA or poisons little MEA is employed.

For example, Patent Document 1 (JP 2009-170273 A) discloses a fuel cell in which a frame member is formed so as to cover the outer circumferential region of a gas diffusion layer. By allowing a projection provided at the frame member to penetrate through the gas diffusion layer to suppress shifting of the frame member, the necessity of providing the gasket is eliminated.

Further, Patent Document 2 (JP 2003-217613 A) discloses a fuel cell in which the impurity eluted from the resin material is adsorbed by an adsorptive medium dispersedly arranged in the separators or the gas diffusion layers, to thereby achieve purification.

PATENT DOCUMENTS

Patent Document 1: JP Unexamined Patent Publication No. 2009-170273
Patent Document 2: JP Unexamined Patent Publication No. 2003-217613

SUMMARY OF THE INVENTION

Subjects to be Solved by the Invention

However, when a material from which impurity is eluted little is used as the material of the gasket, the sealing performance may not be satisfactory, and as a result, the power generation performance of the fuel cell may be reduced. Further, since the material from which impurity is eluted little is normally expensive, the manufacturing cost is increased.

Further, with the structure of Patent Document 1, since no gasket is provided, adhesion between each separator and the frame member may not be satisfactory. Thus, leakage fault of the reactant gas may occur, resulting in a reduction in the power generation performance of the fuel cell.

Further, with the structure of Patent Document 2, in the case where a gas flow channel is formed at the separator or the gas diffusion layer, the adsorptive medium dispersedly arranged in the separator or the gas diffusion layer may increase the pressure loss of the reactant gas, resulting in a reduction in the power generation performance of the fuel cell. Further, provision of the adsorptive medium increases the manufacturing cost.

Accordingly, it is an object of the present invention to improve the above issues, and to provide a fuel cell which can suppress both an increase in the manufacturing cost and a reduction in the power generation performance.

Means for Solving the Subject

In order to achieve the above object, the present invention is configured as follows.

The present invention provides a fuel cell, comprising:
a polymer electrolyte membrane;
a catalyst layer provided on the polymer electrolyte membrane;
a gas diffusion layer provided on the catalyst layer;
a frame member provided on an outer circumferential region of the polymer electrolyte membrane positioned on an outer side relative to an outer edge portion of the gas diffusion layer as seen from a thickness direction of the polymer electrolyte membrane;
a separator provided on the gas diffusion layer, the separator having a close attachment region closely attaching to the frame member; and a gasket provided so as to seal between the separator and the frame member on an outer side relative to the close attachment region as seen from the thickness direction.

Effects of the Invention

With the fuel cell of the present invention, the simple structure of the provision of the close attachment region can prevent the impurity eluted from the gasket from flowing toward the gas diffusion layer. Thus, both an increase in the manufacturing cost and a reduction in the power generation performance can be suppressed.

BRIEF DESCRIPTION OF THE DRAWINGS

These and other aspects and features of the present invention will become clear from the following description taken in conjunction with the preferred embodiment thereof with the accompanying drawings, in which:

FIG. 4 is a partial enlarged cross-sectional view schematically showing the structure of a fuel cell according to a second embodiment of the present invention;

FIG. 5 is a partial enlarged cross-sectional view schematically showing the structure of a fuel cell according to a third embodiment of the present invention;

DETAILED DESCRIPTION OF THE INVENTION

Figure 1:
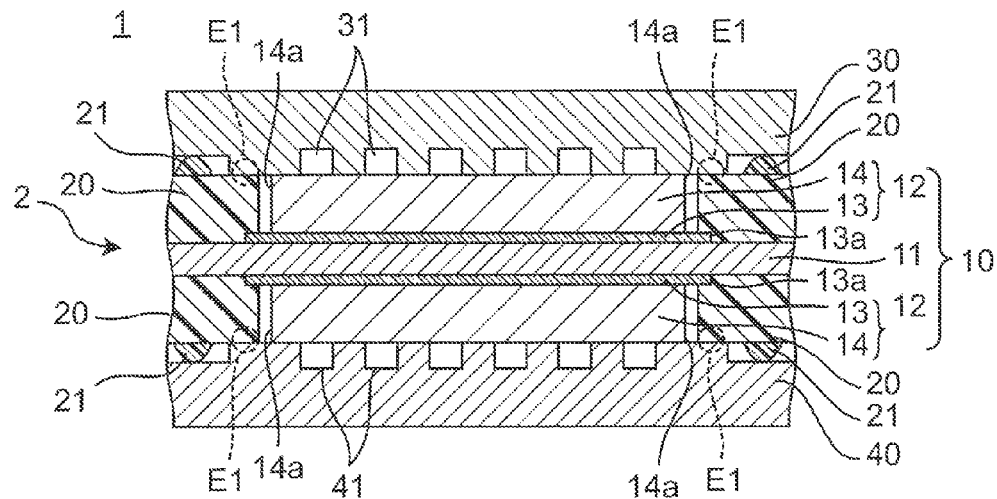
FIG. 1 is a cross-sectional view schematically showing the basic structure of a fuel cell according to a first embodiment of the present invention.

According to a first aspect of the present invention, there is provided a fuel cell, comprising:
a polymer electrolyte membrane;
a catalyst layer provided on the polymer electrolyte membrane;
a gas diffusion layer provided on the catalyst layer;
a frame member provided on an outer circumferential region of the polymer electrolyte membrane positioned on an outer side relative to an outer edge portion of the gas diffusion layer as seen from a thickness direction of the polymer electrolyte membrane;
a separator that is provided on the gas diffusion layer and that has a close attachment region closely attaching to the frame member; and
a gasket provided so as to seal between the separator and the frame member on an outer side relative to the close attachment region as seen from the thickness direction.

According to a second aspect of the present invention, there is provided the fuel cell according to the first aspect, wherein
the outer edge portion of the gas diffusion layer and an inner edge portion of the frame member closely attach to each other.

According to a third aspect of the present invention, there is provided the fuel cell according to the second aspect, wherein
a resin material configuring the frame member partially mixes into an outer circumferential region of the gas diffusion layer.

According to a fourth aspect of the present invention, there is provided the fuel cell according to any one of the first to third aspects, wherein
an outer edge portion of the catalyst layer is positioned on an outer side relative to the outer edge portion of the gas diffusion layer and on an inner side relative to a center portion of the gasket as seen from the thickness direction.

According to a fifth aspect of the present invention, there is provided the fuel cell according to any one of the first to fourth aspects, wherein
a minimum distance between an inner edge portion and an outer edge portion of the close attachment region as seen from the thickness direction is longer than a width of the gasket.

According to a sixth aspect of the present invention, there is provided the fuel cell according to any one of the first to fourth aspects, wherein
a minimum distance between an inner edge portion and an outer edge portion of the close attachment region as seen from the thickness direction is at least twice as great as a width of the gasket.

According to a seventh aspect of the present invention, there is provided the fuel cell according to any one of the first to sixth aspects, wherein
the close attachment region is provided with a bonding member bonding the separator and the frame member.

According to an eighth aspect of the present invention, there is provided the fuel cell according to the first aspect, wherein
the frame member includes an annular convex portion which closely attaches to the separator at the close attachment region.

According to a ninth aspect of the present invention, there is provided the fuel cell according to the eighth aspect, wherein
the separator includes an annular concave portion which receives the convex portion of the frame member at the close attachment region.

According to a tenth aspect of the present invention, there is provided the fuel cell according to the first aspect, wherein
the separator includes an annular convex portion which closely attaches to the frame member at the close attachment region.

In the following, with reference to the drawings, a description will be given of embodiments of the present invention. It is noted that, throughout the drawings, referred to in the following, identical reference symbols are allotted to the identical or corresponding components, and the description thereof will not be repeated.

First Embodiment

Figure 2:
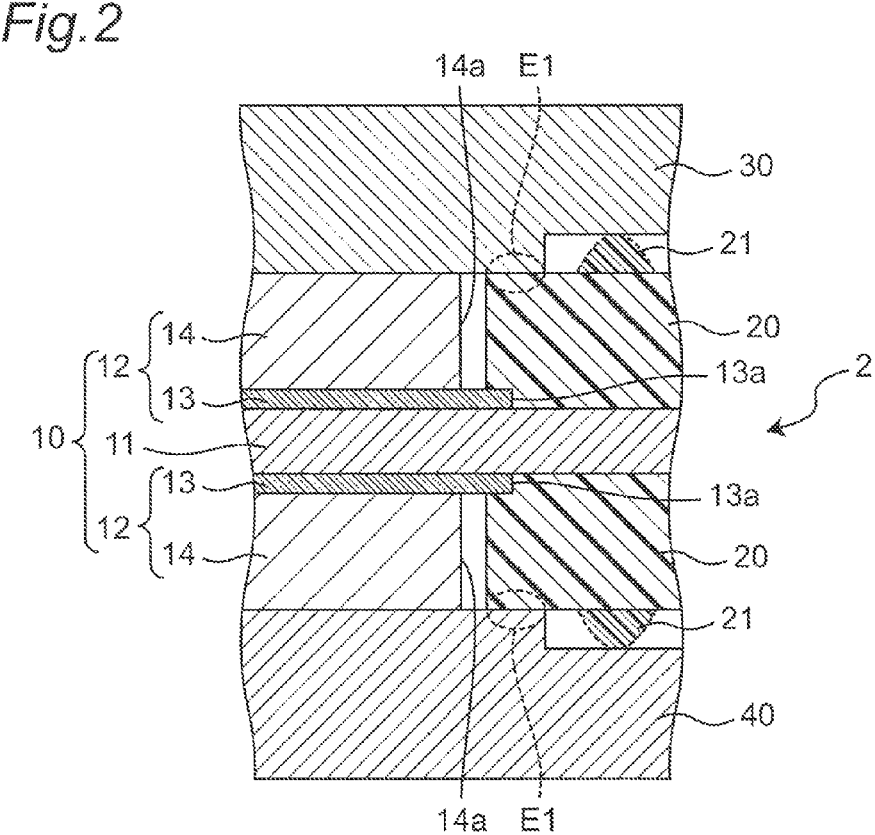
FIG. 2 is a partial enlarged cross-sectional view of the fuel cell shown in FIG. 1.

In the following, a description will be given of a fuel cell according to a first embodiment of the present invention. FIG. 1 is a cross-sectional view schematically showing the basic structure of the fuel cell according to the first embodiment of the present invention. FIG. 2 is a partial enlarged cross-sectional view of the fuel cell.

The fuel cell according to the first embodiment is a polymer electrolyte fuel cell which causes a fuel gas containing hydrogen and an oxidant gas containing oxygen such as air to electrochemically react with each other, such that electric power and heat are simultaneously produced. It is noted that the present invention is not limited to the polymer electrolyte fuel cell, and is applicable to various fuel cells.

As shown in FIG. 1, a fuel cell 1 according to the first embodiment includes an electrode-membrane-frame assembly 2 and paired separators 30 and 40 being arranged such that the electrode-membrane-frame assembly 2 is interposed therebetween. The electrode-membrane-frame assembly 2 includes an MEA (membrane electrode assembly) 10 and a casing trim-like frame member 20 arranged on the outer circumferential region (peripheral portion) of the MEA 10.

The MEA 10 includes a polymer electrolyte membrane 11 and paired electrode layers 12 respectively formed on the opposing faces of the polymer electrolyte membrane 11. One of the paired electrode layers 12 is the anode electrode, and the other one is the cathode electrode. Each electrode layer 12 includes a catalyst layer 13 and a gas diffusion layer 14. The catalyst layer 13 is formed on the surface of the polymer electrolyte membrane 11, and the gas diffusion layer 14 is formed on the catalyst layer 13.

The polymer electrolyte membrane 11 is greater in size than the catalyst layer 13 and the gas diffusion layer 14, and is provided such that its outer circumferential region sticks out from the catalyst layer 13 and the gas diffusion layer 14. On the outer circumferential region (peripheral portion) of the polymer electrolyte membrane 11, the frame member 20 is provided.

The separator 30 is provided on one gas diffusion layer 14, so as to have a close attachment region E1 that closely attaches to the frame member 20 on the outer side relative to the outer edge portion 14a of the one gas diffusion layer 14 as seen from the thickness direction (top-bottom direction in FIG. 1) of the polymer electrolyte membrane 11. As seen from the thickness direction of the polymer electrolyte membrane 11, on the outer side relative to the close attachment region E1, an annular gasket 21 is provided so as to seal between the separator 30 and the frame member 20. Similarly, the separator 40 is arranged on the other gas diffusion layer 14, so as to have a close attachment region E1 that closely attaches to the frame member 20 on the outer side relative to the outer edge portion 14a of the other gas diffusion layer 14 as seen from the thickness direction of the polymer electrolyte membrane 11. As seen from the thickness direction of the polymer electrolyte membrane 11, on the outer side relative to the close attachment region E1, an annular gasket 21 is provided so as to seal between the separator 40 and the frame member 20.

Each gasket 21 is made of a resin material containing a component which disadvantageously influences the MEA 10 (hereinafter simply referred to as the impurity). Therefore, the impurity contained in the resin material may elute. In order to address the problem, in the first embodiment, since the close attachment region E1 is provided between the gasket 21 and the electrode layer 12, the impurity eluted from the gasket 21 can be prevented from flowing toward the gas diffusion layer 14. Accordingly, a reduction in the power generation performance of the fuel cell can be suppressed. Further, thanks to the simple structure of provision of the close attachment regions E1, an increase in the manufacturing cost can be suppressed.

Next, a more detailed description will be given of members structuring the fuel cell 1.

The polymer electrolyte membrane 11 is preferably a polymer membrane having hydrogen ion conductivity. As the polymer electrolyte membrane 11, though it is not particularly limited, for example, fluorine-base polymer electrolyte membrane made of perfluorocarbon sulfonic acid (e.g., Nafion (registered trademark) available from DuPont (United States), Aciplex (registered trademark) available from Asahi Kasei Corporation, Flemion (registered trademark) available from Asahi Glass Co., Ltd.), and a variety of hydrocarbon-base electrolyte membranes can be used. The material of the polymer electrolyte membrane 11 is only required to be capable of selectively moving the hydrogen ions. Though the shape of the polymer electrolyte membrane 11 is not particularly limited, it is substantially rectangular in the first embodiment.

The catalyst layer 13 is preferably a layer containing a catalyst for the oxidation-reduction reaction of hydrogen or oxygen. Preferably, the catalyst layer 13 is provided such that the outer edge portion 13a is positioned on the outer side relative to the outer edge portion 14a of the gas diffusion layer 14 and on the inner side relative to the center portion of the gasket 21, as seen from the thickness direction of the polymer electrolyte membrane 11. In the case where the outer edge portion 13a of the catalyst layer 13 is on the outer side relative to the center portion of the gasket 21, the reactant gas having passed through the inside of the porous catalyst layer 13 tends to flow toward the outside (external leakage), resulting in loss of gas. Further, in the case where the outer edge portion 13a of the catalyst layer 13 is on the inner side relative to the outer edge portion 14a of the gas diffusion layer 14, the gas diffusion layer 14 and the polymer electrolyte membrane 11 may directly be brought into contact with each other, whereby deterioration of the membrane may be accelerated. Further, though the catalyst layer 13 is not particularly limited, for example, it can be configured by a porous member whose main components are carbon powder bearing a platinum-base metal catalyst and a polymer material having proton conductivity. The catalyst layer 13 is only required to have electric conductivity and catalytic activity for the oxidation-reduction reaction of the hydrogen and the oxygen. Though the shape of the catalyst layer 13 is not particularly limited, it is substantially rectangular in the first embodiment. The catalyst layer 13 can be formed by applying or spraying an ink for forming a catalyst layer on the surface of the polymer electrolyte membrane 11. Further, it may be prepared through general transfer process.

Preferably, the gas diffusion layer 14 is configured as a so-called base material-less gas diffusion layer, which is configured without use of carbon fibers as the base material. Specifically, the gas diffusion layer 14 is configured by a porous member whose main components are electrically conductive particles and polymer resin. Here, the "porous member whose main components are electrically conductive particles and polymer resin" refers to a porous member having the structure which is solely supported by the electrically conductive particles and the polymer resin without use of carbon fibers as the base material (a so-called self-supporting structure). In the case where the porous member is manufactured by the electrically conductive particles and the polymer resin, for example, surfactant and dispersing solvent are used. In this case, during the manufacturing process, the surfactant and the dispersing solvent are removed by calcination. Here, in some cases, they may not fully be removed and may remain in the porous member. Accordingly, the "porous member whose main components are electrically conductive particles and polymer resin" means that, so long as it is the self-supporting structure which does not use carbon fibers as the base material, such remaining surfactant and dispersing solvent may be contained in the porous member. Further, so long as it is the self-supporting structure which does not use carbon fibers as the base material, other materials (e.g., short carbon fibers or the like) may be contained in the porous member.

The gas diffusion layer 14 can be manufactured by mixing a mixture containing polymer resin and electrically conductive particles, extruding the mixture, rolling the mixture, and then calcinating the mixture. Specifically, after carbon being the electrically conductive particles, dispersing solvent, and surfactant are fed into an agitating mixer, they are mixed to be ground and granulated. Thus, the carbon is dispersed in the dispersing solvent. Subsequently, fluororesin being the polymer resin is further fed into the agitating mixer to be agitated and mixed, so that the carbon and the fluororesin are dispersed. The obtained mixture is rolled into a sheet-shape, and calcinated to remove the dispersing solvent and the surfactant. Thus, the sheet-like gas diffusion layer 14 can be manufactured.

The material of the electrically conductive particles structuring the gas diffusion layer 14 may include, for example, carbon materials such as graphite, carbon black, activated carbon, and the like. The carbon black may include acetylene black (AB), furnace black, Ketjen black, Vulcan, and the like. These materials may solely be used. Alternatively, a plurality of materials may be used in combination. Further, the carbon material may be in any raw-material form such as powder, fibrous, particulate, and the like.

The material of the polymer resin structuring the gas diffusion layer 14 may include PTFE (polytetrafluoroethylene), FEP (tetrafluoroethylene-hexafluoropropylene copolymer), PVDF (polyvinylidene fluoride), ETFE (tetrafluoroethylene-ethylene copolymer), PCTFE (polychlorotrifluoroethylene), PFA (tetrafluoroethylene-perfluoroalkyl vinyl ether copolymer), and the like. Among others, it is preferable to use PTFE as the material of the polymer resin from the viewpoint of heat resistance, water repellency, and chemical resistance. The raw-material form of PTFE may include dispersion, powder, and the like. Among others, it is preferable to employ dispersion as the raw-material form of PTFE from the viewpoint of workability. It is noted that the polymer resin structuring the gas diffusion layer 14 has the function as the binder coupling the electrically conductive particles with one another. Further, since the polymer resin has water repellency, it also has the function of confining water inside the system in the fuel cell (i.e., water retentivity).

Further, as described above, the gas diffusion layer 14 may contain, in addition to the electrically conductive particles and the polymer resin, a slight amount of surfactant and dispersing solvent used during manufacture. The dispersing solvent may include, for example, water, alcohols such as methanol, ethanol, and the like, and glycols such as ethylene glycol. The surfactant may include, for example, nonionic surfactant such as polyoxyethylene alkyl ether, and amphoteric surfactant such as alkyl amine oxide. The amount of the dispersing solvent and surfactant used during manufacture may be set as appropriate in accordance with the type of the electrically conductive particles, the type of the polymer resin, the mixing ratio thereof, and the like. It is noted that, generally, as the amount of dispersing solvent and the amount of surfactant are greater, the polymer resin and the electrically conductive particles become easier to evenly be dispersed. On the other hand, there is a tendency that flowability becomes higher and formation of the gas diffusion layer into a sheet-shape becomes difficult. It is noted that the surfactant can be selected as appropriate by the type of material of the electrically conductive particles and the type of the dispersing solvent. Further, surfactant may not be used.

It is noted that, the gas diffusion layer 14 may be identical or different in structure between the cathode electrode side and the anode electrode side. For example, it is possible to use a gas diffusion layer using carbon fibers as the base material as one of the cathode electrode side gas diffusion layer and the anode electrode side gas diffusion layer, and a base material-less gas diffusion layer having the structure described above as the other gas diffusion layer.

The frame member 20 is a member provided for improving the handleability of the MEA 10. As the material of the frame member 20, general thermoplastic resin, thermosetting resin, and the like can be used. For example, as the material of the frame member 20, silicone resin, epoxy resin, melamine resin, polyurethane based resin, polyimide based resin, acrylic resin, ABS resin, polypropylene, liquid crystal polymer, polyphenylene sulfide resin, polysulfone, glass fiber reinforced resin, and the like can be used. Though the shape of the frame member 20 is not particularly limited, it is substantially rectangular annular in the first embodiment.

Preferably, the separators 30 and 40 are the members for mechanically fixing the MEA 10. Preferably, the separators 30 and 40 are made of a carbon-containing material or a metal-containing material. In the case where the separators 30 and 40 are made of a carbon-containing material, the separators 30 and 40 can be formed by supplying raw material powder, which is a mixture of carbon powder and resin binder, into a mold assembly, and applying pressure and heat to the raw material powder supplied into the mold assembly. In the case where the separators 30 and 40 are made of a metal-containing material, the separators 30 and 40 may each be a metal plate. Further, the separators 30 and 40 may each be a titanium or stainless steel-made plate having its surface gold-plated.

The main surface (hereinafter also referred to as the electrode face) of the separator 30 which is brought into contact with the gas diffusion layer 14 is provided with a fuel gas-use gas flow channel 31. Further, the main surface (hereinafter also referred to as the electrode face) of the separator 40 which is brought into contact with the gas diffusion layer 14 is provided with an oxidant gas-use gas flow channel 41. By the fuel gas being supplied to the one electrode layer 12 through the gas flow channel 31 and by the oxidant gas being supplied to the other electrode layer 12 through the gas flow channel 41, electrochemical reaction occurs, whereby electric power and heat are produced.

Preferably, the gasket 21 is made of synthetic resin having appropriate mechanical strength and flexibility. The material of the gasket 21 may be a compound such as a rubber material, thermoplastic elastomer, adhesive, and the like. Specific examples of the seal material of the gasket 21 may include fluororubber, silicone rubber, natural rubber, EPDM, butyl rubber, chlorinated butyl rubber, brominated butyl rubber, butadiene rubber, styrene-butadiene copolymer, ethylene vinyl acetate rubber, acrylic rubber, polyisopropylene polymer, perfluorocarbon, polybenzimidazole, thermoplastic elastomer such as polystyrene-base, polyolefin-base, polyester-base, and polyamide-base thermoplastic elastomer, adhesive using latex such as isoprene rubber, butadiene rubber, and the like, or adhesive using liquid polybutadiene, polyisoprene, polychloroprene, silicone rubber, fluororubber, acrylonitrile-butadiene rubber, and the like, although the seal material is not limited to those compounds. Further, these compounds may solely be used, or two or more of them may be used as a mixture or as a compound. Still further, as the seal material of the gasket 21, what can specifically be used is Santoprene 8101-55, which is thermoplastic polyolefin elastomer containing polypropylene and EPDM. Though the shape of the gasket 21 is not particularly limited, it is substantially rectangular annular in the first embodiment.

Figure 3:
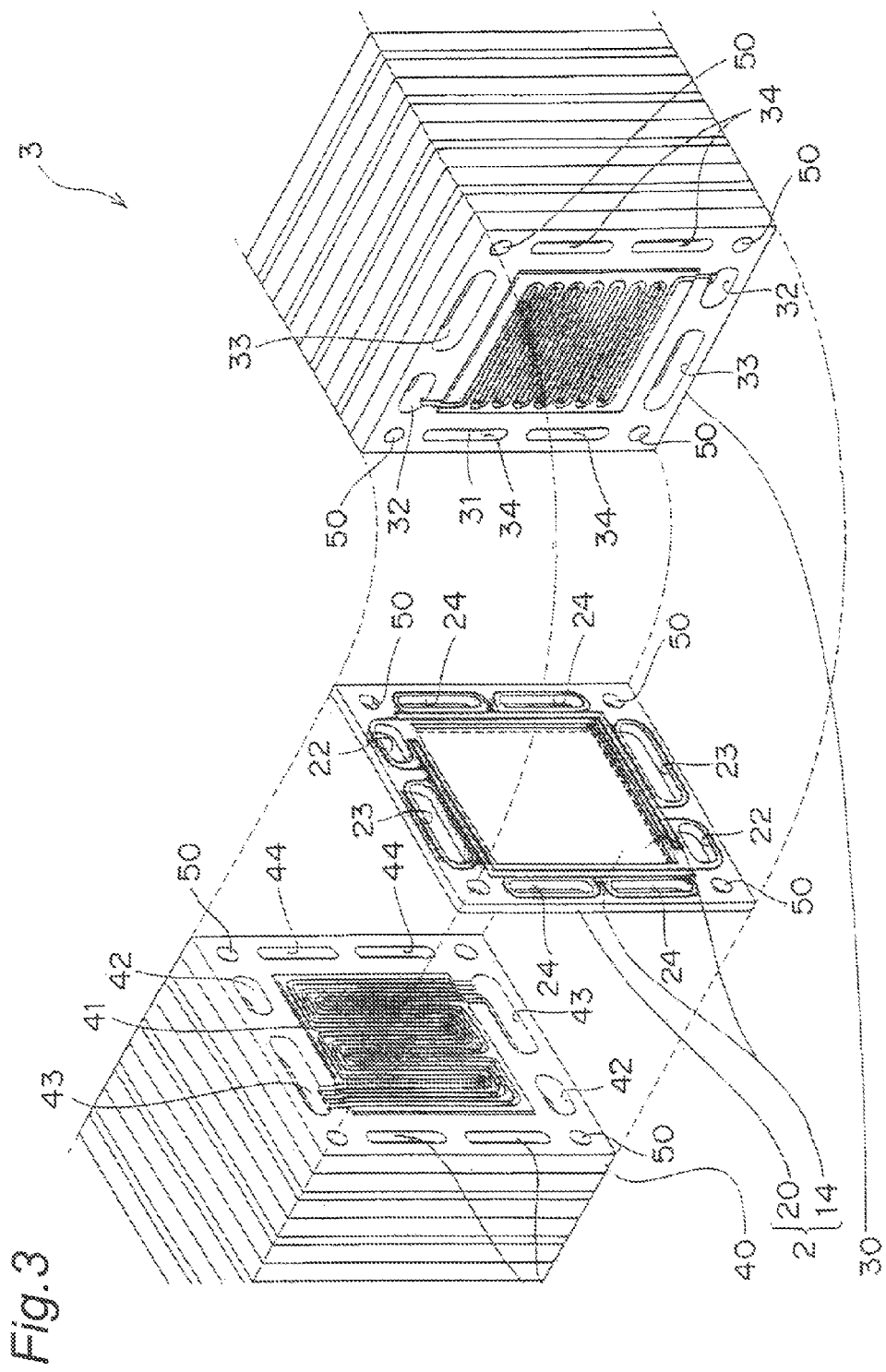
FIG. 3 is an exploded perspective view showing the basic structure of a fuel cell stack made up of a plurality of fuel cells shown in FIG. 1 coupled together.

Next, a description will be given of the structure in which a plurality of fuel cells (unit cells) 1, each of which is shown in FIG. 1, are coupled in series and used as a so-called fuel cell stack. FIG. 3 is an exploded perspective view of the basic structure of a fuel cell stack 3 made up of a plurality of fuel cells 1 being coupled to one another.

In the case where a plurality of fuel cells 1 are used as the fuel cell stack 3, in order to supply the gas flow channels 31 and 41 with the reactant gas (fuel gas or oxidant gas), what is required is manifolds in each of which a pipe supplying the reactant gas is separated into branches in the number corresponding to the number of the separators 30 and 40, and the branch ends are connected to the gas flow channels 31 and 41.

Accordingly, in the first embodiment, as shown in FIG. 3, the frame member 20 and the paired separators 30 and 40 are respectively provided with fuel gas manifold holes 22, 32, and 42, which are paired through holes through which the fuel gas is supplied. Further, the frame member 20 and the paired separators 30 and 40 are respectively provided with oxidant gas manifold holes 23, 33, and 43, which are paired through holes through which the oxidant gas flows. In the state where the frame member 20 and the paired separators 30 and 40 are coupled as the fuel cell 1, the fuel gas manifold holes 22, 32, and 42 are coupled to one another, to form the fuel gas manifold. Similarly, in the state where the frame member 20 and the paired separators 30 and 40 are coupled as the fuel cell 1, the oxidant gas manifold holes 23, 33, and 43 are coupled to one another, to form the oxidant gas manifold.

Further, the frame member 20 and the paired separators 30 and 40 are respectively provided with cooling medium manifold holes 24, 34, and 44, each of which is two pairs of through holes through which cooling medium (e.g., pure water or ethylene glycol) flows. In the state where the frame member 20 and the paired separators 30 and 40 are coupled as the fuel cell 1, the cooling medium manifold holes 24, 34, and 44 are coupled, to form two pairs of cooling medium manifolds.

Further, the frame member 20 and the paired separators 30 and 40 are provided with four bolt holes 50 at their respective corner portions. A fastening bolt is inserted into each bolt hole 50. By a nut being coupled to the fastening bolt, a plurality of fuel cells 1 are fastened.

The gas flow channel 31 is provided so as to connect between a pair of fuel gas manifolds 32 and 32. The gas flow channel 41 is provided so as to connect between a pair of oxidant gas manifolds 43 and 43. It is noted that, though the gas flow channels 31 and 41 are each shown as a serpentine-type flow channel in FIG. 3, they may be the flow channels of other mode (e.g., linear-type flow channels).

Further, though not shown, at the main surface opposite to the electrode face of the separator 30 and at the main surface opposite to the electrode face of the separator 40, cooling medium flow channels are preferably formed, respectively. The cooling medium flow channels are formed so as to connect between two paired cooling medium manifold holes 34 and 44, respectively. That is, they are configured such that the cooling medium branches from the cooling medium manifolds on the supply side into the cooling medium flow channels, to flow through the cooling medium manifolds on the discharge side. Thus, using the heat-transfer capability of the cooling medium, it is designed such that the fuel cell 1 is maintained at a prescribed temperature suitable for the electrochemical reaction.

It is noted that, in the foregoing, the description has been given of a so-called internal manifold scheme fuel cell as an example, in which the manifold holes of fuel gas, oxidant gas, and coolant are provided to the separators 30 and 40, and which is designed such that the supply manifolds of fuel gas, oxidant gas, and coolant are formed when being stacked. However, the present invention is not limited thereto. For example, it may be a so-called external manifold scheme fuel cell in which the supply manifolds of fuel gas, oxidant gas, and coolant are provided at the side faces of the fuel cell stack 3. In this case also, the similar effect can be obtained. Further, it may be a so-called internal humidification scheme fuel cell in which the separators 30 and 40 are each formed by a porous conductor, and the pressure of the coolant flowing through the cooling medium flow channel is set to be higher than the pressure of the reactant gas flowing through the gas flow channels 31 and 41, such that part of the coolant transmits through the separators 30 and 40 toward the electrode face, to humidify the polymer electrolyte membrane 11.

Further, in the foregoing, though the separators 30 and 40 are respectively provided with the gas flow channels 31 and 41, the present invention is not limited thereto. For example, the one gas diffusion layer 14 may be provided with the gas flow channel 31, and the other gas diffusion layer 14 may be provided with the gas flow channel 41. Further, both the separator 30 and the one gas diffusion layer 14 may be provided with the gas flow channel 31. Still further, both the separator 40 and the other gas diffusion layer 14 may be provided with the gas flow channel 41.

As described above, according to the first embodiment of the present invention, since the close attachment region E1 is provided between the gasket 21 and the gas diffusion layer 14 as seen from the thickness direction of the polymer electrolyte membrane 11, the impurity eluted from the gasket 21 can be prevented from flowing toward the gas diffusion layer 14. Accordingly, it becomes possible to suppress a reduction in the power generation performance of the fuel cell. Further, thanks to the simple structure of provision of the close attachment region E1, an increase in the manufacturing cost can be suppressed.

Second Embodiment

Next, a description will be given of a fuel cell according to a second embodiment of the present invention. FIG. 4 is a partial enlarged cross-sectional view schematically showing the structure of the fuel cell according to the second embodiment of the present invention. The fuel cell according to the second embodiment is different from the fuel cell according to the first embodiment in that the thickness of the frame member 20 is greater than the thickness of the electrode layer 12, and that the separators 30 and 40 are respectively provided with step portions 30a and 40a.

According to the second embodiment, since the close attachment region E1 is provided, the effect similar to that in the first embodiment can be obtained. Further, according to the second embodiment of the present invention, since the separators 30 and 40 are respectively provided with the step portions 30a and 40a, the route taken by the impurity eluted from the gasket 21 to reach the electrode layer 12 is longer than that in the first embodiment (see FIG. 2). Therefore, the amount of the impurity eluted from the gasket 21 and reaching the electrode layer 12 can be suppressed, and a reduction in power generation performance of the fuel cell can further be suppressed.

Third Embodiment

Next, a description will be given of a fuel cell according to a third embodiment of the present invention. FIG. 5 is a partial enlarged cross-sectional view schematically showing the structure of the fuel cell according to the third embodiment of the present invention. The fuel cell according to the third embodiment is different from the fuel cell according to the first embodiment in that a width W1 of the close attachment region E1 is at least twice as great as a width W2 of the gasket 21. As used herein, the "width of the close attachment region E1" refers to the minimum distance between the inner edge portion and the outer edge portion of the close attachment region E1 as seen from the thickness direction of the polymer electrolyte membrane 11.

According to the third embodiment, since the width W1 of the close attachment region E1 is set to be at least twice as great as the width W2 of the gasket 21, the adhesion between the separators 30 and 40 and the frame member 20 can further be improved. Further, since the route taken by the impurity eluted from the gasket 21 reaching the electrode layer 12 is longer than that in the first embodiment (see FIG. 2), the amount of impurity eluted from the gasket 21 and reaching the electrode layer 12 can be suppressed. Accordingly, a reduction in power generation performance of the fuel cell can further be suppressed.

It is noted that, in the third embodiment, though the width W1 of the close attachment region E1 is set to be at least twice as great as the width W2 of the gasket 21, the present invention is not limited thereto. For example, the width W1 of the close attachment region E1 may be shorter than the width W2 of the gasket 21. However, the longer the width W1 of the close attachment region E1, the greater the effect of suppressing a reduction in the power generation performance of the fuel cell. Therefore, it is preferable that the width W1 of the close attachment region E1 is longer than the width W2 of the gasket 21. More preferably, as in the third embodiment, the width W1 of the close attachment region E1 is at least twice as great as the width W2 of the gasket 21. Further, still more preferably, the width W1 of the close attachment region E1 is at least third times as great as the width W2 of the gasket 21.

Fourth Embodiment

Figure 6:
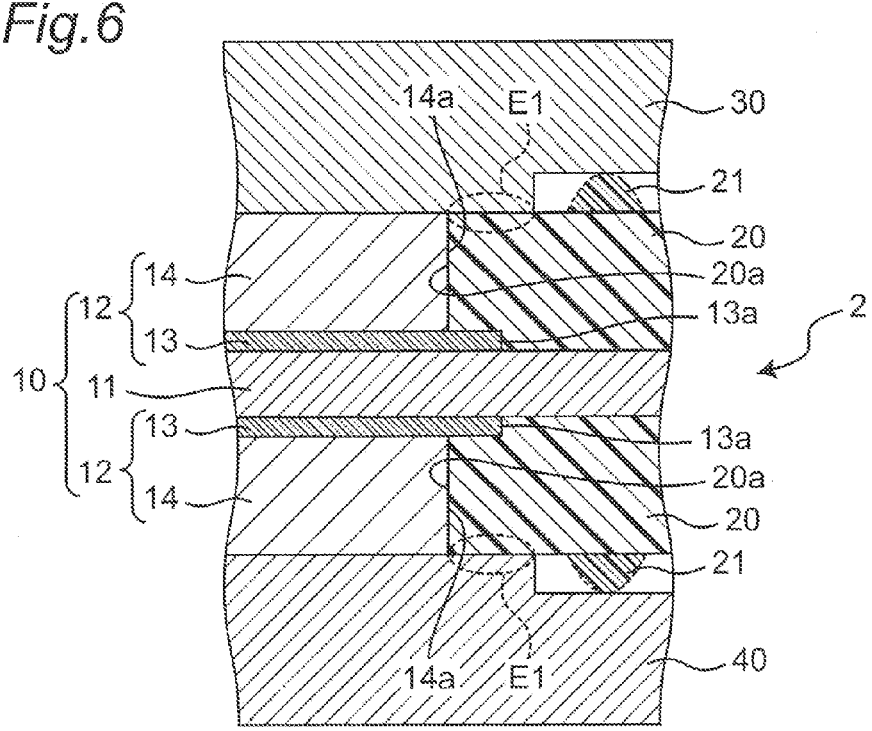
FIG. 6 is a partial enlarged cross-sectional view schematically showing the structure of a fuel cell according to a fourth embodiment of the present invention.

Next, a description will be given of a fuel cell according to a fourth embodiment of the present invention. FIG. 6 is a partial enlarged cross-sectional view schematically showing the structure of the fuel cell according to the fourth embodiment of the present invention. The fuel cell according to the fourth embodiment is different from the fuel cell according to the first embodiment in that the outer edge portion 14a of the gas diffusion layer 14 and the inner edge portion 20 of the frame member 20 closely attach to each other.

According to the fourth embodiment, since the outer edge portion 14a of the gas diffusion layer 14 and the inner edge portion 20a of the frame member 20 closely attach to each other, it becomes possible to suppress the impurity eluted from the gasket 21 from flowing into the catalyst layer 13 or the polymer electrolyte membrane 11 through between the gas diffusion layer 14 and the frame member 20. Thus, it becomes possible to further suppress a reduction in the power generation performance of the fuel cell.

It is noted that, from the viewpoint of further causing the outer edge portion 14a of the gas diffusion layer 14 and the inner edge portion 20a of the frame member 20 to attach to each other, it is preferable that the resin material structuring the frame member 20 is partially mixed (impregnated) into the outer circumferential region of the gas diffusion layer 14. Thus, a reduction in the power generation performance of the fuel cell can further be suppressed. It is noted that the "outer circumferential region of the gas diffusion layer 14" mainly refers to the region which is not intended to contribute toward power generation.

Fifth Embodiment

Figure 7:
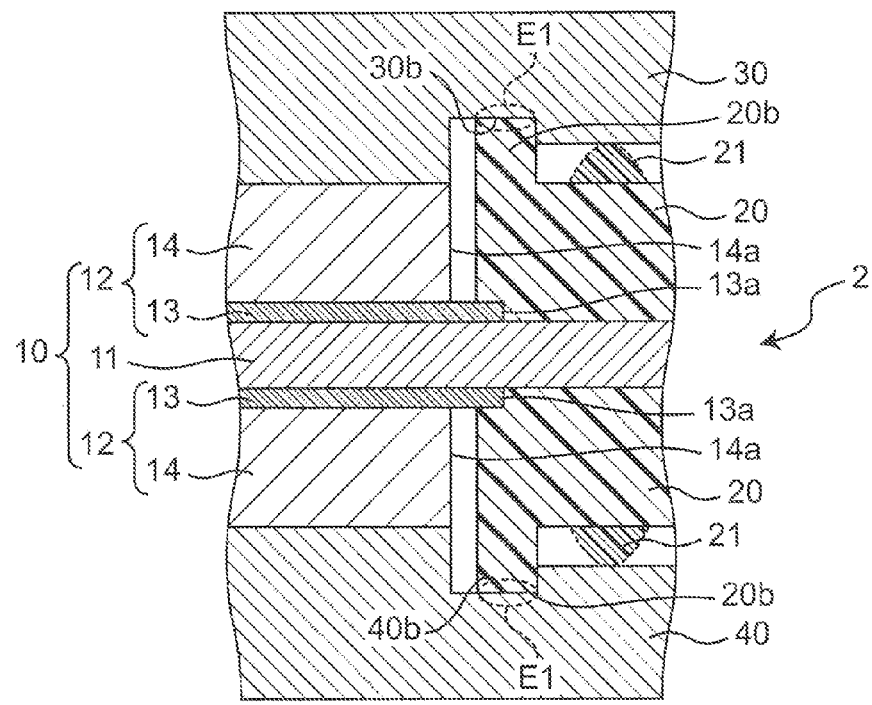
FIG. 7 is a partial enlarged cross-sectional view schematically showing the structure of a fuel cell according to a fifth embodiment of the present invention.

Next, a description will be given of a fuel cell according to a fifth embodiment of the present invention. FIG. 7 is a partial enlarged cross-sectional view schematically showing the structure of the fuel cell according to the fifth embodiment of the present invention. The fuel cell according to the fifth embodiment is different from the fuel cell according to the first embodiment in that, in the close attachment region E1, the frame member 20 is provided with convex portions 20b, and that the separators 30 and 40 are provided with concave portions 30b and 40b receiving the convex portions 20b, respectively.

According to the fifth embodiment, by causing the convex portions 20b of the frame member 20 and the concave portion 30b of the separators 30 and 40 to closely attach to each other, it becomes possible to further suppress the impurity eluted from the gasket 21 from flowing into the gas diffusion layer 13 or the polymer electrolyte membrane 11. Further, since the route taken by the impurity eluted from the gasket 21 reaching the electrode layer 12 is longer than that in the first embodiment (see FIG. 2), the amount of the impurity eluted from the gasket 21 and reaching the electrode layer 12 can be suppressed. Still further, since it is not necessary to increase the width of the frame member 20 (the right-left direction in FIG. 5) as in the third embodiment (see FIG. 5), a further increase in size of the fuel cell can be suppressed.

Further, the frame member 20 is generally formed by: arranging the MEA 10 in a mold assembly; pouring a molten resin material into the mold assembly; and cooling the same. At the time of cooling, the molten resin material shrinks. Variations in the shrinking may cause the frame member 20 to warp. In particular, in the case where the gas diffusion layer 14 of the MEA 10 is the base material-less gas diffusion layer described above, because of the low rigidity of the gas diffusion layer 14, the frame member 20 tends to warp. In contrast, according to the fifth embodiment, provision of the annular convex portion 20b to the frame member 20 allows the convex portion 20b to function as a rib. Thus, the frame member 20 is suppressed from warping.

Figure 8:
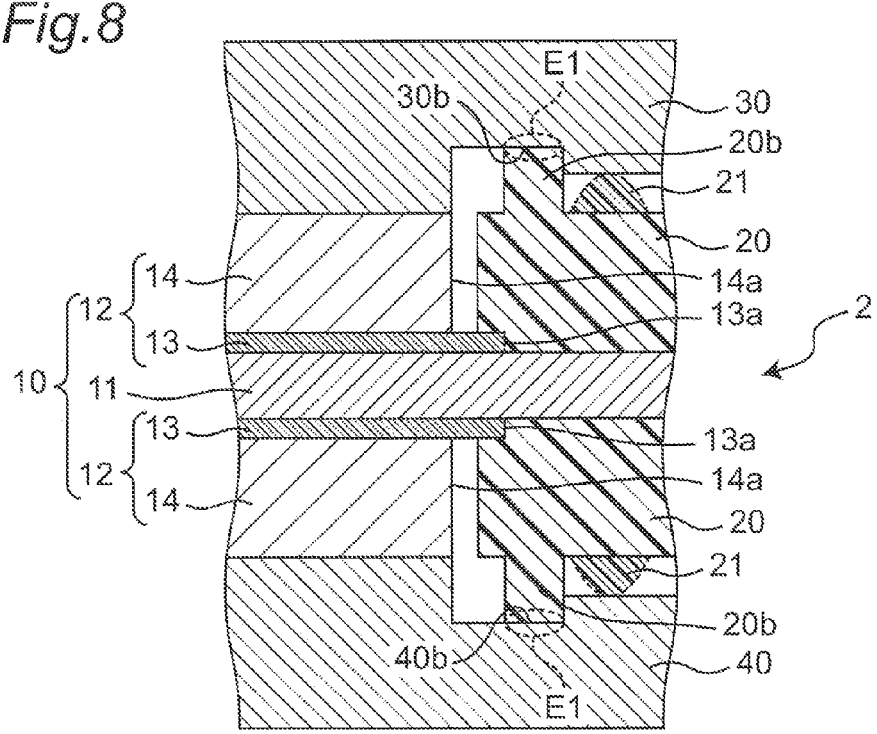
FIG. 8 is a partial enlarged cross-sectional view showing a variation of the fuel cell shown in FIG. 7.

It is noted that, in the fifth embodiment, from the viewpoint of suppressing the impurity eluted from the gasket 21 from flowing into the gas diffusion layer 13 or the polymer electrolyte membrane 11, the separators 30 and 40 are provided with the concave portions 30b and 40b. However, the concave portions 30b and 40b are not necessarily provided. Further, in FIG. 7, though the convex portion 20b is shown as being flush relative to the inner edge portion of the frame member 20, the present invention is not limited thereto. For example, as shown in FIG. 8, the convex portion 20b may be provided on the outer side relative to the inner edge portion of the frame member 20.

Sixth Embodiment

Figure 9:
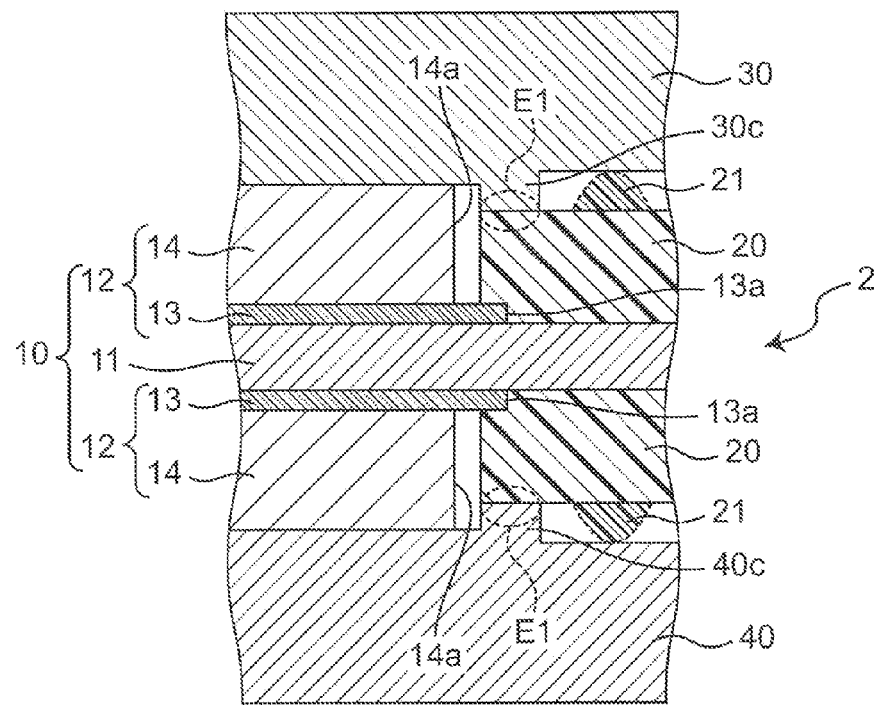
FIG. 9 is a partial enlarged cross-sectional view schematically showing the structure of a fuel cell according to a sixth embodiment of the present invention.

Next, a description will be given of a fuel cell according to a sixth embodiment of the present invention. FIG. 9 is a partial enlarged cross-sectional view schematically showing the structure of the fuel cell according to the sixth embodiment of the present invention. The fuel cell according to the sixth embodiment is different from the fuel cell according to the first embodiment in that the thickness of the frame member 20 is smaller than the thickness of the electrode layer 12, and that the separators 30 and 40 are respectively provided with convex portions 30c and 40c.

According to the sixth embodiment, since the close attachment region E1 is provided between the gasket 21 and the electrode layer 12, the effect similar to that in the first embodiment can be obtained. Further, according to the sixth embodiment of the present invention, since the separators 30 and 40 are respectively provided with the convex portions 30c and 40c, the route taken by the impurity eluted from the gasket 21 reaching the electrode layer 12 is longer than that in the first embodiment (see FIG. 2). Thus, the amount of impurity eluted from the gasket 21 and reaching the electrode layer 12 can be suppressed, and a reduction in the power generation performance of the fuel cell can further be suppressed.

Seventh Embodiment

Figure 10:
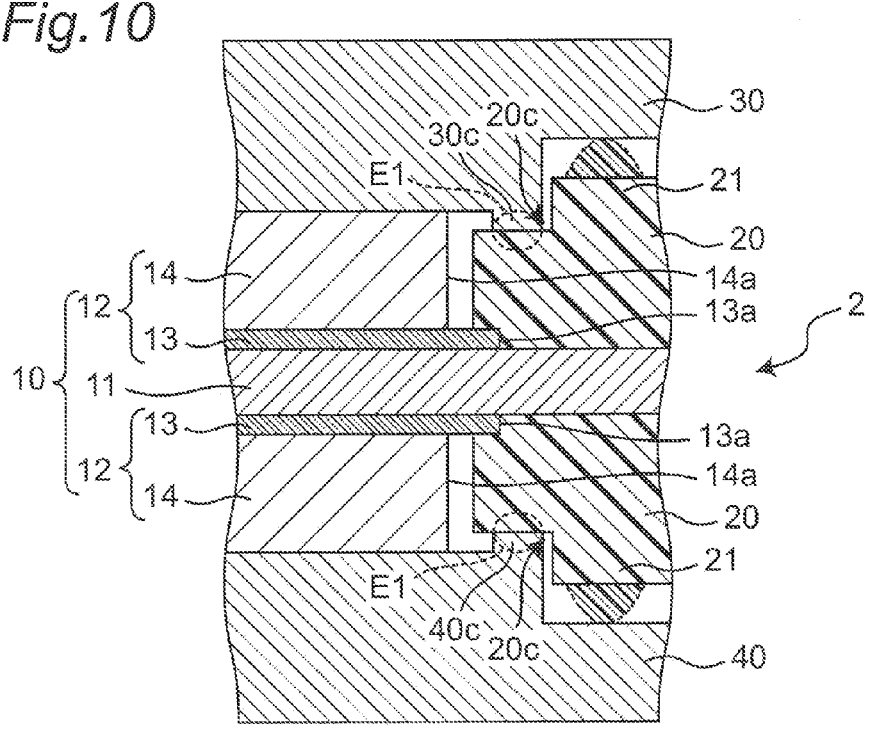
FIG. 10 is a partial enlarged cross-sectional view schematically showing the structure of a fuel cell according to a seventh embodiment of the present invention.

Next, a description will be given of a fuel cell according to a seventh embodiment of the present invention. FIG. 10 is a partial enlarged cross-sectional view schematically showing the structure of the fuel cell according to the seventh embodiment of the present invention. The fuel cell according to the seventh embodiment is different from the fuel cell according to the sixth embodiment in that the frame member 20 is provided with step portions 20c receiving the convex portions 30c and 40c of the separators 30 and 40.

According to the seventh embodiment of the present invention, since the separators 30 and 40 are provided with the convex portions 30c and 40c and the frame member 20 is provided with the step portions 20c, the route taken by the impurity eluted from the gasket 21 and reaching the electrode layer 12 is longer than the sixth embodiment (see FIG. 9). Thus, the amount of the impurity eluted from the gasket 21 and reaching the electrode layer 12 can be suppressed, and a reduction in power generation performance of the fuel cell can further be suppressed.

Eighth Embodiment

Figure 11:
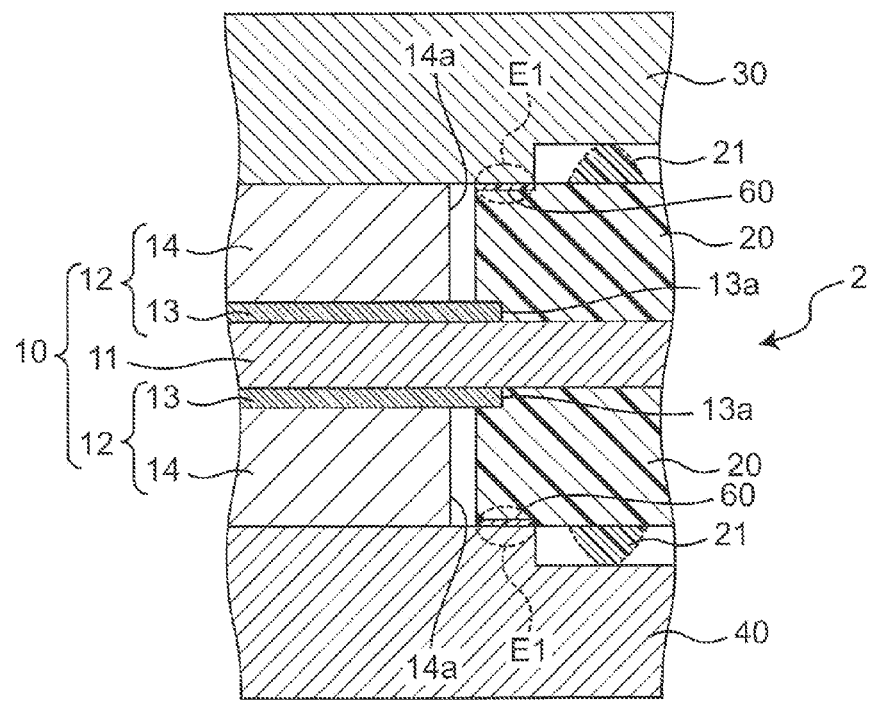
FIG. 11 is a partial enlarged cross-sectional view schematically showing the structure of a fuel cell according to an eighth embodiment of the present invention.

Next, a description will be given of a fuel cell according to an eighth embodiment of the present invention. FIG. 11 is a partial enlarged cross-sectional view schematically showing the structure of the fuel cell according to the eighth embodiment of the present invention. The fuel cell according to the eighth embodiment is different from the fuel cell according to the first embodiment in that the close attachment region E1 is provided with a bonding member 60 bonding the separators 30 and 40 and the frame member 20 to each other.

According to the eighth embodiment, provision of the bonding member 60 to the close attachment region E1 makes it possible to further improve adhesion between the separators 30 and 40 and the frame member 20. Thus, a reduction in power generation performance of the fuel cell can further be suppressed.

It is noted that, as the material of the bonding member 60, for example, sealing agent such as polyisobutylene-base (TB1152 available from ThreeBond Co., Ltd. or the like), silicone-base, epoxy resin-base, addition polymerization olefin-base, acrylic resin-base, styrene-base, nitrile-base, phenol-base, hot-melt-base, latex-base, or fluorine-base sealing agent can be used.

It is noted that the present invention is not limited to the foregoing embodiments, and can be practiced in other various modes. For example, in the foregoing embodiments, though the frame member 20 is arranged on each of the anode electrode side and the cathode electrode side such that the polymer electrolyte membrane 11 is interposed therebetween, the present invention is not limited thereto. For example, it is possible to structure such that the frame member 20 on the anode electrode side and the frame member 20 on the cathode electrode side are connected to each other at the ends. Further, though the casing trim-like frame member has been shown in the foregoing, the present invention is not limited thereto and various modes can be employed.

Further, any combinations of the foregoing embodiments can exhibit their respective effects.

INDUSTRIAL APPLICABILITY

The fuel cell of the present invention can suppress an increase in the manufacturing cost and a reduction in the power generation performance. Accordingly, it is useful as a fuel cell used as the drive source of a mobile object such as an automobile, a dispersed power generation system, a domestic cogeneration system, or the like.

Although the present invention has fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

The disclosure of Japanese Patent Application No. 2011-174625 filed on Aug. 10, 2011 including specification, drawings, and claims are incorporated herein by reference in its entirety.

The invention claimed is:

1. A fuel cell, comprising:
   a polymer electrolyte membrane;
   a catalyst layer provided on the polymer electrolyte membrane;
   a gas diffusion layer provided on the catalyst layer;
   a frame member provided on an outer circumferential region of the polymer electrolyte membrane positioned on an outer side relative to an outer edge portion of the gas diffusion layer in a width direction of the polymer electrolyte membrane;
   a separator provided on the gas diffusion layer, the separator having a direct attachment region which is directly attached to the frame member; and
   a gasket provided so as to seal between the separator and the frame member on an outer side relative to the direct attachment region in the width direction,
   wherein with respect to a cross-section taken along a thickness direction of the fuel cell, the frame member is arranged on an outermost side of the polymer electrolyte membrane in the thickness direction, the gasket is arranged on an outermost side of the frame member in the thickness direction, and the separator is arranged on an outermost side of the gasket in the thickness direction.

2. The fuel cell according to claim 1, wherein
   the outer edge portion of the gas diffusion layer and an inner edge portion of the frame member directly attach to each other.

3. The fuel cell according to claim 2, wherein
a resin material configuring the frame member partially mixes into an outer circumferential region of the gas diffusion layer.

4. The fuel cell according to claim 1, wherein
a minimum distance between an inner edge portion and an outer edge portion of the direct attachment region in the width direction is longer than a width of the gasket.

5. The fuel cell according to claim 1, wherein
a minimum distance between an inner edge portion and an outer edge portion of the direct attachment region in the width direction is at least twice as great as a width of the gasket.

6. The fuel cell according to claim 1, wherein
the frame member includes an annular convex portion which is directly attached to the separator at the direct attachment region.

7. The fuel cell according to claim 6, wherein
the separator includes an annular concave portion which receives the convex portion of the frame member at the direct attachment region.

8. The fuel cell according to claim 1, wherein
the separator includes an annular convex portion which directly attaches to the frame member at the direct attachment region.

9. The fuel cell according to claim 1, wherein an outer edge portion of the catalyst layer is positioned on an outer side relative to the outer edge portion of the gas diffusion layer in the width direction, and on an inner side relative to a center portion of the gasket in the width direction.

* * * * *